July 18, 1967    L. M. HARVEY    3,331,937
LIQUID METAL SWITCH

Filed March 1, 1965    3 Sheets-Sheet 1

INVENTOR.
LUKE M. HARVEY
BY James C. Davis Jr.
HIS ATTORNEY

July 18, 1967

L. M. HARVEY 3,331,937

LIQUID METAL SWITCH

Filed March 1, 1965

INVENTOR.
LUKE M. HARVEY

BY *James C. Davis Jr.*

HIS ATTORNEY

July 18, 1967     L. M. HARVEY     3,331,937
LIQUID METAL SWITCH

Filed March 1, 1965     3 Sheets-Sheet 3

INVENTOR.
LUKE M. HARVEY
BY *James C. Davis Jr.*
HIS ATTORNEY

United States Patent Office 3,331,937
Patented July 18, 1967

3,331,937
LIQUID METAL SWITCH
Luke M. Harvey, Schenectady, N.Y., assignor to General
Electric Company, a corporation of New York
Filed Mar. 1, 1965, Ser. No. 436,113
17 Claims. (Cl. 200—152)

The present invention relates generally to high current capacity electrical switches and, more particularly, pertains to switches of this kind having an electrically conductive liquid as a current-carrying portion thereof.

There is presently a demand in industry for electric energy sources providing electrical current of large magnitude and having a relatively low electric potential or voltage. Electrolysis processes and arc furnaces are but two examples of where the demand arises. The magnitude of current required is oftentimes in excess of 100,000 amperes and can exceed 1,000,000 amperes. The output voltage of the source is usually in the order of 15 volts or less and seldom exceeds 500 volts in most such high current applications. Electrical energy sources of the kind under discussion have heretofore consisted of many individual elemental sources of lesser capacity combined to provide the total current capacity required.

The art of electric energy generation has advanced now to the point where a single electrical energy source is capable of providing electric current having a magnitude well in excess of 100,000 amperes so that the many disadvantages attendant the use of composite sources, as high cost, large size and current balancing difficulties, can be obviated. By way of example, a particularly advantageous single source of electric energy for high current applications is a generator of the variety disclosed in my copending application entitled, "Acyclic Generator," Ser. No. 17,447, filed Mar. 16, 1960, and assigned to the assignee of the present invention, now U.S. Patent 3,211,936.

The advantages of using a single source of electric current in exces of 100,000 amperes have been partially offset heretofore by the unavailability of a suitable switch that is capable of electrically connecting and disconnecting the source and the apparatus that utilizes the electric energy. It is apparent that switching schemes that utilize a plurality of individual switching elements which share the switching function, whether provided within a single enclosure or as separate units, increase both the size and cost of the installation. More significant, however, in most applications, is the fact that the use of a plurality of switching elements reintroduces the oftentimes unsolvable problem of unequal current distribution among the elements which leads to premature switch failure and other well-known disadvantages.

Accordingly, it is an object of my invention to provide an electric switch and method of operation therefor that overcomes one or more of the above-noted disadvantages of heretofore known electrical switches when used in high current applications.

Another object of my invention is to provide an electrical switch having a higher current-carrying capacity than heretofore known electrical switches.

Still another object of my invention is to provide an electrical switch having only a single pair of electrodes with a continuous current-carrying capacity greater than heretofore known switches having only a single pair of electrodes.

Yet, another object of my invention is to provide a disconnect switch for high current applications that features fewer current paths than heretofore known disconnect switches.

Briefly stated, in accord with one aspect of the present invention, there are provided two electrical contacts having electrode faces disposed in opposed closely spaced relationship. An insulating member is sandwiched between the electrode faces and forms therewith a closed chamber. Separate supply and discharge passageways are provided for permitting a highly conductive liquid to be continuously circulated through the chamber between the electrodes when it is desired to establish electrical conduction in the switch.

In a preferred embodiment of the invention the supply passageway has an inlet to the chamber between the electrodes located adjacent the outer peripheral edge of one of the electrodes and the outlet for the discharge passageway is disposed near the center of this same electrode. In this way, electromagnetic forces attendant conduction of electric current between the electrodes promote continuous circulation of the conductive liquid through the chamber and provide a high current capacity switch that is compact in design and reliable in operation.

The subject matter which I regard as my invention is particularly pointed out and distinctly claimed in the concluding portion of this specification. My invention, however, both as to organization and method of operation, together with further objects and advantages thereof, may be best understood by reference to the following description taken in connection with the accompanying drawings in which:

Figure 1:
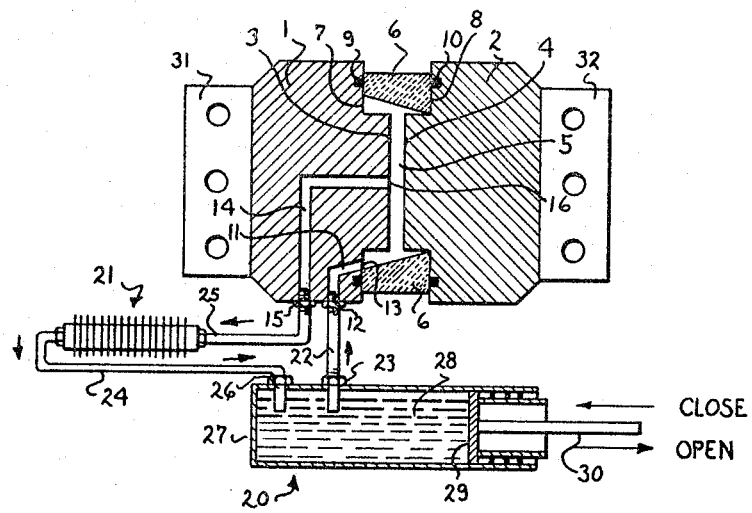
FIGURE 1 is a simplified diagram of switching apparatus that is helpful in understanding the principle of operation of the present invention.

The electrically conductive liquid switch illustrated in FIGURE 1 includes a first electrode, or contact," 1 and a second electrode, or "contact," 2. When the switch is in its conductive, or closed, state, electrodes 1 and 2 are in intimate electrical energy exchange relationship and the impedance to electric current is extremely low. Otherwise, electrodes 1 and 2 are electrically insulated from each other to provide an open circuit, or no conduction of electric current, between them. The foregoing is oftentimes realized in other kinds of electric switches by causing relative movement of the electrodes between separated and physically touching positions. However, the electrical resistance, known as contact resistance, between the touching electrodes when the switch is closed is too great in this kind of switch for high current applications and the magnetic forces tend to separate the electrodes. The switch of FIGURE 1 features stationary, or fixed, electrodes 1 and 2 and conduction between the electrodes is established or terminated by selectively supplying a conductive plasma or fluid, and preferably a liquid, between the electrodes in a manner to be more fully described hereinafter that effects an extremely low resistance path suitable for high current applications.

Electrodes 1 and 2 have respective electrode faces 3 and 4 that provide the immediate external surfaces of electrodes 1 and 2 which are in intimate electrical energy exchange relationship when the switch is in the closed position. Suitable mounting means, not included in the simplified illustration of FIGURE 1, support electrodes 1 and 2 in electrically insulated relationship with respective electrode faces 3 and 4 positioned in opposed closely spaced relationship to each other.

To provide substantially uniform spacing of faces 3 and 4 as desired for an essentially uniform current distribution in electrodes 1 and 2 adjacent faces 3 and 4, the faces are conveniently selected to have complementary shaped surfaces. Thus, if face 3 is convex, then face 4 is concave, for example. Preferably, faces 3 and 4 are both selected to be substantially planar, as illustrated, for ease of manufacture.

In order to minimize the electrical resistance between electrodes 1 and 2 when the switch is in the closed condition, faces 3 and 4 are closely spaced. The spacing is advantageously selected to be as small as possible consistent with being sufficiently great to permit rapid egress of conductive liquid from between the electrodes when opening the switch. To this end, the spacing should not be so small that the conductive liquid bridges the gap between electrode faces 3 and 4 in the absence of a continuous supply of liquid therebetween. The suitable spacing distance changes in the same direction as variations in surface tension of the conductive liquid selected. I have found that the spacing is advantageously selected to be in the range of from approximately 1.1 to about two times the vertical height of a freely standing puddle of the particular conductive liquid selected. The puddle referred to is conveniently formed by spilling a small quantity of the liquid upon a horizontal flat plate, preferably fabricated of the material from which electrodes 1 and 2 are fabricated.

A closed chamber, or vessel, 5 is desired, that includes electrode faces 3 and 4 as portions of the interior walls thereof, for constraining conductive liquid supplied to the space between the electrodes. In the interests of compactness, increased speed of response and economy of conductive liquid, the shape of the chamber is selected advantageously to include faces 3 and 4 as substantial portions of the interior walls thereof. To this end, a ring, or continuous frame 6 is advantageously provided that encircles faces 3 and 4 and abuts peripheral surfaces 7 and 8 of electrodes 1 and 2, respectively. Suitable seals 9 and 10 that conveniently can be O-rings if faces 3 and 4 are selected to be generally circular, ensure that no conductive liquid can escape from chamber 5 past the engaged surfaces of ring 6 and surfaces 7 and 8. Because ring 6 touches both electrode 1 and electrode 2, in the embodiment of FIGURE 1, ring 6 is at least partially, and preferably entirely, fabricated of electrical insulation material so that it does not form a permanent conductive bridge between the electrodes and thereby defeat a principal purpose of the switch.

In order to render the switch selectively conductive or nonconductive some kind of conduit, passageway, opening or other means of communication with chamber 5 is needed so that the chamber can be selectively filled with or emptied of, respectively, conductive liquid. In addition, it is required that there be circulation of the conductive liquid through chamber 5 in the high current applications contemplated in the present invention. Accordingly, two separate such communication means are advantageously provided. Further, in accord with my invention, an outlet from the chamber to one communication means is disposed substantially at the geometrical center of the face of one electrode so that electromagnetic forces promote circulation of the conductive liquid and can obviate pumps, or other circulation means, thereby reducing the cost of the switch.

In the illustration of FIGURE 1, a conductive liquid supply passageway 11 is shown in electrode 1. Passageway 11 includes an externally accessible inlet 12 and an inlet 13 to chamber 5. Inlet 13 is advantageously disposed outside the peripheral edge of electrode face 3 in order to ensure complete circulation and avoid stagnant liquid pockets within chamber 5. In general, it is desired for optimum performance that inlet 13 be disposed in a wall of chamber 5 other than the portions thereof formed by the electrode faces 3 or 4. In addition, inlet 13 is preferably selected to be adjacent the bottom of chamber 5 to facilitate prompt and complete draining thereof when electrical conduction is no longer desired between electrodes 1 and 2. Of course, passageway 11 can include equally well a plurality of inlets to chamber 5, in which event only one need be disposed adjacent the bottom.

A conductive liquid discharge passageway 14 is illustrated in electrode 1 and includes an externally accessible outlet 15 and an outlet 16 from chamber 5 located substantially at the center of face 3. When a cluster of restricted outlets from chamber 5 are substituted for outlet 16, only one need be disposed approximately at the center of face 3. Location of at least one discharge passageway outlet approximately at the center of one electrode face not only causes circulation of the conductive liquid by the constricting electromagnetic forces but also has been found to provide the low boundary resistance at the interface between the circulating conductive liquid and electrode faces that is necessary in high current applications. In order to prevent undesired electrical paths in the conductive liquid supply system, the discharge passageway 14 is provided in only one of electrodes 1 and 2, selected to be electrode 1 in FIGURE 1. The supply passageway 11 is electrically insulated from the other electrode, electrode 2 in the drawing, and is preferably provided only in either electrode 1, as shown or in insulating ring 6, or both.

In the usual case, the "center" of the electrode face as used herein and in the appended claims is the geometrical center of the electrode face, e.g., the intersection of the diagonals of a rectangular or square electrode face, or the mid-point of a major diameter of a circular electrode face. It is desired that outlet 16 be located at the center for constricting magnetic forces acting upon the liquid to provide the most efficient circulation. Thus, outlet 16 is preferably located at the center of the inwardly directed magnetic forces, regardless of the particular geometry of the electrode face in the interests of simplicity of design and efficiency of circulation, although other locations and/or well-known flow directing or diverting means as vanes or grooves on the electrode face can be used at a sacrifice of one or both interests. When the circulating efficiency is reduced in this way, auxiliary pumps, and the like, can be used to supplement or entirely maintain the desired circulation, although the cost of the switch is thereby increased.

Supply passageway 11 and discharge passageway 14 are separate from each other to provide the most efficient circulation of liquid metal. To this end, inlet 13 and outlet 16 must be spaced apart from each other within chamber 5, although there can be communication between passageways 11 and 14 within electrode 1 for immediate recirculation in whole or in part or for other purposes. Thus, by separate passageways as used herein and in the appended claims, it is intended to specify that at least the respective inlets and outlets are in spaced relationship within the chamber between the electrodes so that the passageways appear separate as viewed from the chamber.

Means for selectively supplying a conductive liquid to inlet 12 of supply passageway 11 is shown schematically to include a receptacle having a controllable volume, or variable pressure reservoir, indicated generally at 20, a heat exchanger 21 and suitable plumbing in the form of a pipe 22 connected between a first opening 23 into reservoir 20 and inlet 12, and pipes 24 and 25 that connect a second opening 26 of reservoir 20 to outlet 15 of discharge passageway 14 in series with heat exchanger 21. Variable pressure reservoir 20 includes a cylinder 27 containing a supply of conductive liquid 28 having a piston 29. As the force applied to connecting rod 30 of piston 29 is varied, there is a corresponding variation in the pressure of liquid 28, as is well known to those skilled in the art.

Operation of the switch of FIGURE 1 is as follows. With reduced pressure in reservoir 20, all of the conductive liquid 28 is drained from chamber 5. Consequently, there is no conductive path between electrodes 1 and 2, and the switch is open. The switch is closed by increasing the pressure within reservoir 20, as by exerting a force upon connecting rod 30 sufficient to cause conductive liquid to substantially fill chamber 5. Filling is advantageously aided in many cases by providing an expansion tank and communication thereto from the top of chamber 5, although such means are omitted for simplicity in the drawing of FIGURE 1.

An electrically conductive path is established between the electrodes by conductive liquid that bridges the gap between the electrodes in chamber 5. After the conductive liquid rises to a height above outlet 16, constricting electromagnetic forces that act upon the liquid and are directed radially inward toward the center of electrode faces 3 and 4, cause forced circulation of the conductive liquid. Thus, the liquid is forced from the peripheral portions of chamber 5 inwardly and out through outlet 16. The forced flow is through passageway 14 to outlet 15 thereof and through pipe 25, heat exchanger 21 and pipe 24 back to reservoir 20 where the incoming liquid forces recirculation of liquid from reservoir 20 up through pipe 22 and supply passageway 11 into chamber 5 from inlet 13. In this way, a continuous fresh supply of conductive liquid is recirculated to the outer peripheral portion of chamber 5, enabling sustained circulation of conductive liquid and sustained electrical conduction of the switch.

The switch is opened by decreasing the pressure within reservoir 20, as by reducing the force applied by connecting rod 30 of piston 29. The supply of liquid to chamber 5 is thereby stopped and substantially all of the liquid exits through outlet 16 under the influence of magnetic forces. Any remaining conductive liquid in chamber 5 drains therefrom through pasageway 11 and pipe 22 into reservoir 20, until there is no longer a conductive medium establishing a conductive path between electrodes 1 and 2.

Means for connecting the switch in a circuit to be connected and disconnected conveniently take the form of one or more bus bar connectors 31 and 32 electrically connected to electrodes 1 and 2, respectively, as by welding, brazing, soldering or otherwise being attached thereto. Alternatively, connectors 31 and 32 can be fabricated as an integral part of the electrodes.

The number of alternatives that are known or can be devised to replace the particular variable pressure reservoir 20, illustrated in FIGURE 1, is so large that an exhaustive summary is impossible and even a partial list would be confusing and would perhaps detract from the central theme of the invention. It is required only that the supply of conductive liquid be sufficient to provide a continuous supply of the circulated liquid to the chamber between the electrodes and that some means be provided to selectively control the supply in order to open and close the switch. Draining of the chamber is equally advantageously effected in many cases, after the supply is discontinued, by orienting the chamber to completely drain through one or more discharge passageways. It is not necessary that the discharge passageway communicate with the reservoir in any closed supply loop configuration, as illustrated, although a closed system as shown is preferred in the interests of economy and efficiency in the use of conductive liquid. Accordingly, various schemes ranging from merely raising and lowering a reservoir of conductive liquid, through the use of pumps or the like operating upon compressed gases or upon the conductive liquid itself, to the ues of means for selectively lowering the pressure within the chamber between the electrodes to attract and expel the conductive liquid, and combinations thereof, are all considered well within the scope of the present invention.

Heat exchanger 21 usually is employed as a cooler to dissipate heat from chamber 5 carried to the exchanger by the circulating conductive liquid. However, heat exchanger 21 is advantageously used as a heater in applications wherein the electrodes 1 and 2 are subjected to a low temperature environment, particularly when a high melting temperature conductive liquid is employed. Heat exchanger 21 can be replaced by or combined with reservoir 20 or electrode 1, and both the heat exchanger 21 and reservoir 20 can be formed as integral portions of electrode 1, without departing from the scope of the present invention.

Figure 2:
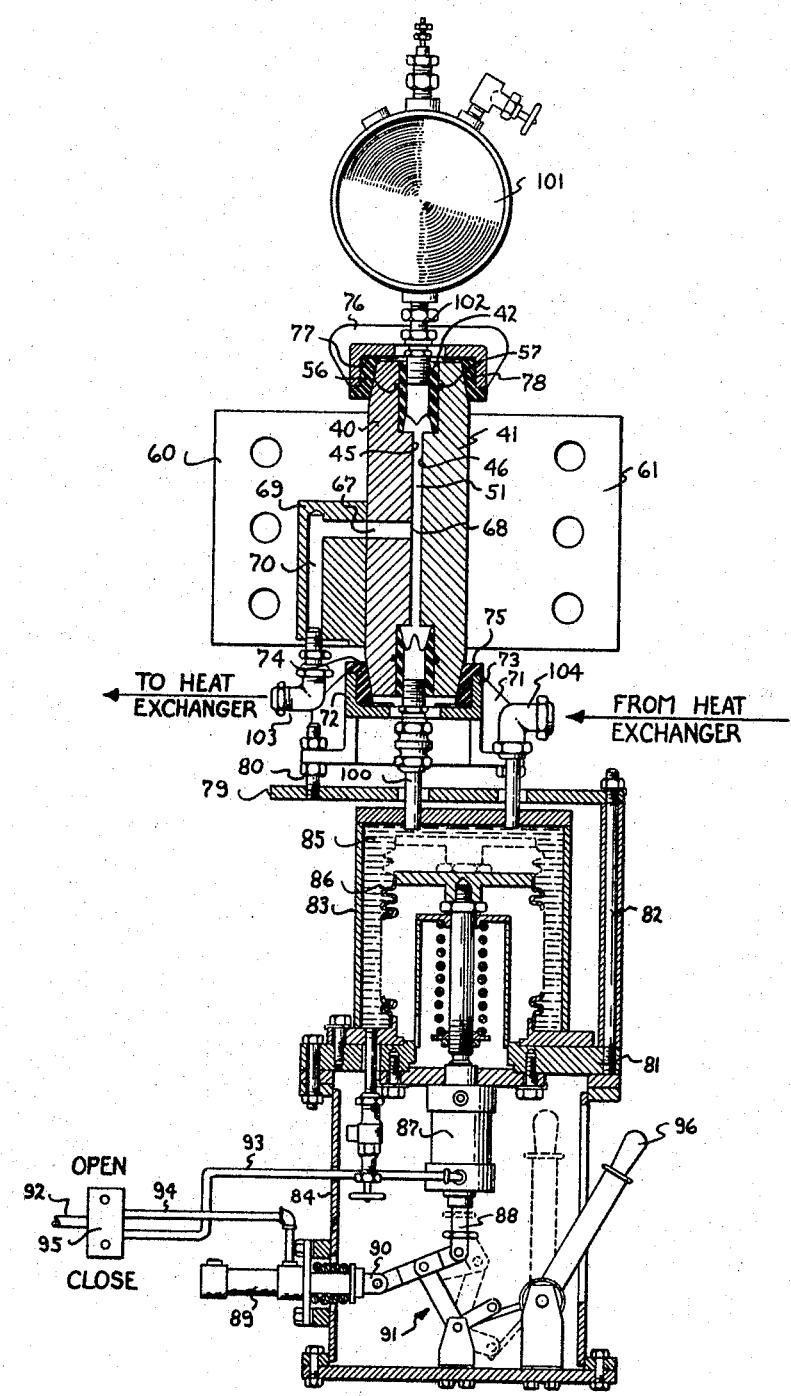
FIGURE 2 is a partial sectional view of switching apparatus in accord with a specific embodiment of the invention.

FIGURE 2 is a sectional view of a specific liquid metal switch suitable for use in accord with my invention. The switch includes an electrode assembly, more easily understood by referring to the exploded view of FIGURE 3, that features a pair of electrodes 40 and 41 and an electrically insulating spacer 42; corresponding to electrodes 1 and 2 and ring 6 of FIGURE 1, respectively.

Electrodes 40 and 41 can be fabricated of any of a plurality of low resistance metals or alloys; however, copper is a presently preferred material and has proven serviceable under actual operating conditions. Its advantageous electrical, physical and mechanical properties are to be desired. Spacer 42 can be fabricated of any of a plurality of well-known insulating materials; however, the epoxy compounds, for example, that sold under the trademark "Textolite," are preferred because they can be readily formed in the shape illustrated. The alternative electrode assembly of FIGURE 1 is more suitable when it is desired to use relatively frangible and unworkable insulating materials as aluminum oxide, for example, that provide the advantage of having surfaces even less easily wet by most conductive liquids than the epoxy compounds.

Electrodes 40 and 41 include cylindrical central bosses 43 and 44, respectively, that terminate in substantially planar respective circular electrode faces 45 and 46. Spacer 42 has two coaxial cylindrical apertures 47 and 48 opening into a central walled enclosure 49 and adapted to receive bosses 43 and 44, respectively. The wall of enclosure 49 includes a ridge 50 that projects radially inwardly to increase the length of the surface resistance path between electrodes when assembled as in FIGURE 2.

In the assembled position, insulating spacer 42 provides with electrodes 40 and 41 a closed chamber in which substantial portions of the inner walls are provided by electrode faces 45 and 46. The electrodes are positioned with their respective electrode faces 45 and 46 in opposed closely spaced relationship. Bosses 43 and 44 are essentially coaxially disposed and the distance in the axial direction between electrode faces 45 and 46 is substantiall uniform over the entire surface thereof. The spacing selected, it will be recalled from the discussion of FIGURE 1, depends upon the surface tension of the conductive liquid selected.

To ensure the complete closure and integrity of chamber 51, electrodes 40 and 41 have annular O-ring grooves 52 and 53 formed about bosses 43 and 44, respectively, adapted to receive flexible sealing rings for engagement with the opposed major surfaces 54 and 55 of spacer 42. The sealing rings are shown at 56 and 57 in FIGURE 2.

Electrodes 40 and 41 are provided with suitable connector receiving means on the backsides thereof, i.e., on the sides opposite bosses 43 and 44, that take the form of a plurality of vertical grooves 58 and 59. Complementary shaped connectors, illustrated at 60 and 61, are conveniently brazed to the sides of the grooves 58 and 59. Connectors 60 and 61 are preferably fabricated of substantially the same material as electrodes 40 and 41, in this illustrative embodiment, copper.

A conductive liquid supply passageway 65 is molded, drilled or otherwise formed in spacer 42 adjacent the bottom of enclosure 49 and an expansion passageway 66 is similarly formed adjacent the top of enclosure 49. In accord with a particular feature of the invention, a discharge passageway is formed in electrode 40 and includes an outlet 68 from chamber 51 positioned substantially at the geometrical center of electrode face 45 of electrode 40. An extension block 69 secured to the back surface of electrode 40 has a conduit 70 therein which communicates with passageway 67 and provides a convenient externally accessible outlet from chamber 51, although the entire discharge path can be equally well formed in electrode 40 in most cases. The illustrated scheme has the advantage of least disturbing the current distribution in electrode 40.

A lower frame 71, including spaced upwardly extending flanges 72 and 73, cooperates with beveled insulating bushings 74 and 75, respectively, to support electrodes 40 and 41 in electrically insulated relationship with their respective electrode faces 45 and 46 positioned in opposed closely spaced relationship. A like upper frame 76 bears down against the top beveled surfaces of electrodes 40 and 41 through corresponding beveled insulators 77 and 78, respectively. As frames 71 and 76 are urged toward one another, as by tightening carriage bolts and nuts (not shown), the electrodes 40 and 41 press more tightly against their respective mating surfaces on spacer 42. In like manner, side supporting frames and insulators (not shown) are advantageously used in most cases to distribute more evenly the mechanical stress in electrodes 40 and 41.

Frame 71 is fastened to a platform 79, as by bolts 80, to provide the base supporting member for the electrode assembly. Platform 79 is secured to a plate 81, as by carriage bolts 82, that is the bottom support for a variable pressure reservoir 83 and also serves as the top cover of an actuating mechanism housing 84. Plate 81 is, in turn, supported by and fixed to housing 84 that provides the bottom component of the switch. Normally, the switch depends from and is supported by the bus bars to which it is connected.

Reservoir 83 contains a conductive liquid 85 and a bellows 86 that is expandable and contractable to selectively control the quantity of liquid 85 within reservoir 83. Thus, reservoir 83 can be considered to be of selectively variable capacity insofar as liquid 85 is concerned.

Power actuated switch closing is accomplished by means of a fluid motor 87 having a vertically movable connecting rod 88 that is connected to bellows 86. Power actuated switch opening is accomplished by means of a fluid motor 89 having a horizontally movable connecting rod 90 which is connected to rod 88 by suitable linkage, generally shown at 91.

In operation, pipe 92 is supplied with a fluid under pressure and can be selectively connected to pipe 93 or pipe 94 through control valve 95 to effect closing or opening of the switch, respectively. Providing fluid to pipe 93 forces connecting rod 87 upwardly, expands bellows 86 to the dotted line position, and fills chamber 51 through pipe 100. Linkage 91 moves slightly over-center to secure rod 87 in the upper position in the absence of further fluid pressure from pipe 93.

The switch is opened by supplying fluid pressure to pipe 94, moving rod 90 to the left and releasing the linkage from its locked position. Alternatively, manual opening lever 96 is moved to the solid line position shown to effect switch opening. Lever 96 is connected to linkage 91 through a lost-motion coupling so that normally the lever occupies the dotted line position, regardless of automatic operation of the switch.

Bellows 86 is tightly sealed within reservoir 83 and the reservoir walls define a total volume that is essentially constant. The top level of conductive liquid 85 is selected to be approximately at the height of the lowest portion of spacer 42 when bellows 86 is contracted. Accordingly, movement of bellows 86 to the expanded position, shown by the dashed lines, forces liquid up through pipe 100, that communicates between reservoir 83 and passageway 65, filling chamber 51 and causing electrical conduction between electrodes 40 and 41.

An expansion tank 101 communicates with passageway 66 through pipe 102 in order to secure more complete and rapid filling and draining of chamber 51. Tank 101 is preferably filled with an inert gas under pressure, and I prefer dry nitrogen gas, under a pressure of about 3.0 p.s.i.g., because of its relatively high ionization potential. The pressure increases to about 9.0 p.s.i.g. when the switch is closed.

As discussed during the description of FIGURE 1, the conductive liquid is forced to circulate from chamber 51 into centrally disposed discharge outlet 68 and finally exits from discharge pipe 103. Discharge pipe 103 is connected to the inlet of a suitable heat exchanger (not shown) that can be a simple bank of finned tubes between two headers or other such means well known in the art. The liquid is returned to reservoir 83 from the heat exchanger through inlet pipe 104 to provide a closed system that conserves and reuses the conductive liquid. The returning liquid from pipe 104 forces more liquid up pipe 100 to chamber 51, establishing a complete closed circulation path for sustained conduction of the switch.

The switch is opened by actuating the "open" button on panel 93 that, in turn, effects contraction of bellows 86. Alternatively, the switch is opened manually by moving handle 87 to the position shown in solid lines. In the embodiment described, the pressurized nitrogen from tank 101 and force of gravity combine to quickly purge chamber 51 of conductive liquid and replace the liquid with the nonconductive gas, nitrogen.

There are a plurality of conductive liquids suitable for use in accord with the present invention, including sodium-potassium (NaK), mercury (Hg), gallium (Ga) and lead-bismuth (Woods Metal). The following characteristics, among others, are advantageously sought (1) high electrical conductivity, (2) high thermal conductivity, (3) great ability to wet the surface of the electrode material, (4) essentially nonreactive with the electrode material, (5) low surface tension, (6) low viscosity, and (7) light weight. While some compromise is inevitable, the presently preferred embodiment of my invention seeks an optimum marriage of the foregoing criteria by using copper electrode material and sodium-potassium (in stoichiometric proportion) as the conductive liquid. Noncurrent carrying metal components of the system, including bellows 86, that contact the sodium-potassium are fabricated of a low carbon steel, and preferably stainless steel. Sodium-potassium wets the surface of steel, as well as copper, for excellent thermal transfer and is essentially nonreactive therewith.

A freely standing puddle of sodium-potassium under standard conditions is approximately 0.20 inch in height. Accordingly, the substantially uniform perpendicular distance between electrode faces 45 and 46 is selected to be from about 0.22 inch to approximately 0.40 inch. I have discovered a distance of approximately 0.25 inch to be particularly advantageous from the points of view of low resistance between the electrodes, proper circulation of the sodium-potassium between the electrode faces, and rapid and complete expulsion of sodium-potassium upon opening the switch.

Figure 3:
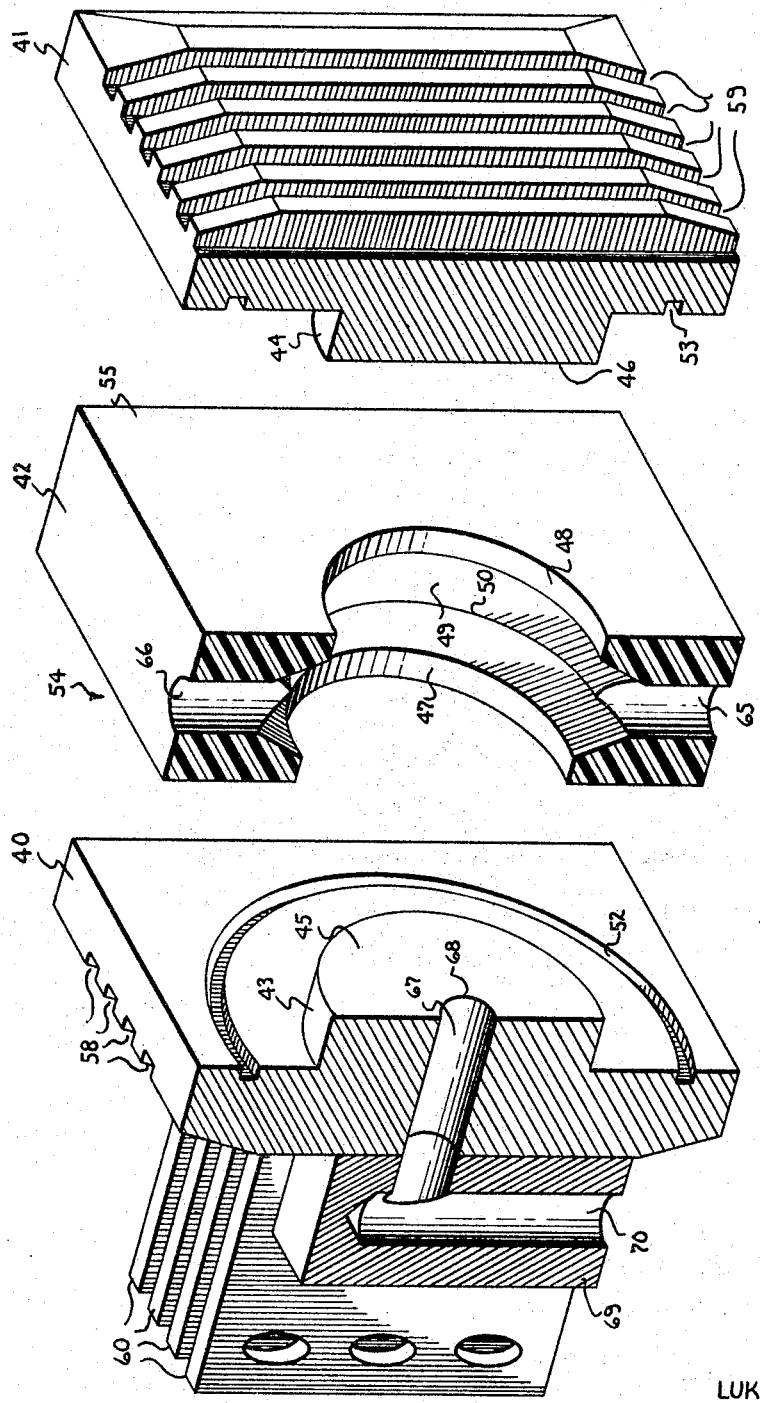
FIGURE 3 shows in detail the electrode configuration in the apparatus of FIGURE 2.

A fuller appreciation of the unique capabilities of switches in accord with my invention is perhaps best grasped from the following test examples representing typical, as opposed to maximum, performance of a switch as shown and described in conjunction with FIGURES 2 and 3. The electrodes were fabricated of copper and the electrode faces were each about 63.5 square inches in area and spaced approximately 0.25 inch apart. A test source of 4 volts D.C. was used and the conductive fluid was sodium-potassium liquid metal. (1) The switch was opened and closed 1500 times in a circuit carrying 100,000 amperes and the electrodes showed no visible erosion or deformation upon disassembly and inspection. (2) The switch interrupted 150,000 amperes with ease. (3) The switch closed a circuit carrying 225,000 amperes without difficulty. (4) The potential difference between electrodes when the switch was carrying 150,000 amperes was about 0.011 volt. (5) The switch circulated the sodium-potassium at a rate of 25 gallons per minute, when carrying 150,000 amperes, without benefit of external pumps or the like. (6) The switch carried in excess of 600,000 amperes without failure or damage.

It will be appreciated by those skilled in the art that electric energy sources featuring variable voltage and capable of supplying in excess of 100,000 amperes are not readily available, if available at all. Accordingly, the foregoing tests are constrained to the fixed 4 volt D.C. source at hand, that is suitable for electrolysis, while the switch is not necessarily similarly constrained, but its usefulness extends to alternating current as well as to higher voltages and currents.

The illustrative embodiment of FIGURE 2 readily withstands an open circuit voltage of 500 volts and interrupts a circuit when the inter-electrode voltage is about 18 volts. The latter is related to the ionization potential of Na, in the particular liquid selected, as will be apparent to those skilled in the art. Of course, sources greater than 18 volts are disconnected by providing suitable means to reduce the potential between the electrodes during the opening cycle, or selecting a conductive liquid having constituents with higher ionization potentials.

A valued feature of my invention is the self-regulation of conductive liquid circulation that can, in most cases, obviate special controls. More specifically, the quantity of liquid circulated in a given time increases and decreases with increases and decreases, respectively, in the magnitude of electric current conducted. This is because the magnetic forces, that cause circulation in the preferred embodiments of my invention, vary in strength in the same direction as changes in the magnitude of current. Thus, when the conducted current increases in magnitude, increasing the losses within the switch, circulation increases to provide more rapid removal of heat. The reverse is true for a decrease in current magnitude. In short, the rate of conductive liquid circulation is responsive to the magnitude of current conducted to compensate for variations in electrical losses within the switch.

Figure 4:
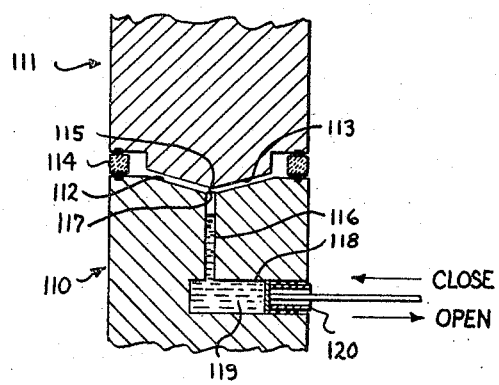
FIGURE 4 is a partial sectional view of another switch embodying the invention.

FIGURE 4 illustrates a lower current capacity embodiment of the present invention wherein the conductive fluid is not circulated and the supply and discharge means are combined. While the previously described embodiments of my invention, featuring circulating conductive metal, are advantageously used in the current range of from approximately 1,000 to in excess of 10,000 amperes per square inch of electrode area, the more economical embodiment of FIGURE 4 is advantageously employed when the corresponding current density is from about 100 to approximately 1,000 amperes per square inch. The embodiment of FIGURE 4 does not have separate supply and discharge passageways, but can otherwise be identical in electrode shape to the previous embodiments. Similarly, the configuration of FIGURE 4 could as well be used in the previous embodiments by incorporating the aforementioned feature of an additional passageway.

Electrodes 110 and 111 of FIGURE 4 are illustrated in cross section and include respective complementary shaped faces 112 and 113 that are in closely spaced relationship and define with spacer 114 a closed electrode chamber 115. A passageway 116 includes an outlet 117 disposed substantially at the center of face 112. A variable volume reservoir 118 is filled with conductive liquid 119 and formed within electrode 110.

In operation, a piston 120, or other means, compresses the liquid 119 within reservoir 118 to force it up through passageway 116 into chamber 115. As previously discussed, the switch is thereby rendered conductive. To open the switch, the volume of reservoir 118 is increased and liquid drains from chamber 115 very rapidly under the influence of the magnetic force.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

What I claim as new and desire to secure by Letters Patent of the United States is:

1. An electric switching device comprising:
   (a) a first electrode and a second electrode having respective electrode faces;
   (b) means supporting said electrodes in electrically insulated relationship with said respective electrode faces positioned in opposed spaced proximity to each other, and providing with said electrodes a closed chamber having said spaced electrode faces included as walls thereof;
   (c) separate conductive liquid supply and discharge passageways communicating with said chamber, said discharge passageway having an outlet from said chamber located approximately at the center of one of said electrode faces;
   (d) supply means communicating with said supply passageway for selectively supplying continuously a conductive liquid to said chamber; and,
   (e) means for connecting said first and second electrodes in an electrical circuit.

2. The device of claim 1 wherein said respective electrode faces provide substantial portions of the inner walls of said chamber.

3. The device of claim 2 wherein said supply means includes a variable pressure reservoir.

4. The device of claim 3 wherein said discharge passageway communicates with said reservoir to return conductive liquid thereto that has circulated through said chamber.

5. The device of claim 4 wherein said discharge passageway communicates with said reservoir through a heat exchanger.

6. The device of claim 4 wherein said supply passageway is disposed in said means providing with said electrodes a closed chamber.

7. A device of claim 4 wherein said supply passageway is disposed in the electrode having said one of said electrode faces.

8. The device of claim 6 wherein said conductive liquid is essentially sodium potassium metal and the distance between said spaced electrode faces is substantially uniform and in the range from about 0.22 inch to approximately 0.4 inch.

9. The device of claim 7 wherein said conductive liquid is essentially sodium potassium metal and the distance between said spaced electrode faces is substantially uniform and in the range from about 0.22 inch to approximately 0.4 inch.

10. The device of claim 8 including a third passageway communicating with said chamber and connected to a source of pressurized inert gas.

11. The device of claim 9 including a third passageway communicating with said chamber and connected to a source of pressurized inert gas.

12. An electric switching device comprising:
    (a) two electrodes immovably positioned and electrically insulated relative to each other, each electrode having an electrode face, and said electrode faces being in closely spaced opposed relationship to define a narrow chamber therebetween;
    (b) means disposed at least in part in one of said two electrodes to selectively supply a circulating conductive liquid through said chamber, said means being responsive to variations in the magnitude of electric current conducted between said two electrodes to provide a corresponding variation in the rate of circulation of said conductive liquid; and (c) means for connecting said electrodes in an electric circuit.

13. The method of selectively establishing conduction of electric current that can have a sustained density in excess of 1000 amperes per square inch between two fixed electrode faces of complementary shape, which method comprises:
(a) positioning said electrode faces in closely spaced opposed relationship; and
(b) selectively supplying under pressure a conductive liquid to said space and recirculating said liquid through said space at a rate of flow that varies in the same direction as changes in the magnitude of current conducted between said electrode faces through said liquid.

14. An electric circuit switching device comprising:
(a) first and second electrodes supported in electrically insulated relationship and having respective electrode faces positioned in opposed spaced relationship;
(b) enclosure means providing a closed chamber having said spaced electrode faces included therein;
(c) supply means communicating with said chamber adapted to selectively supply a conductive fluid thereto;
(d) a discharge passageway communicating with said chamber and having an outlet from said chamber disposed approximately at the center of one of said electrode faces;
(e) means for connecting said electrodes in an electrical circuit;
(f) said supply means including a variable volume reservoir; and
(g) said discharge passageway communicating with said reservoir through a heat exchanger to return conductive liquid thereto that has circulated through said chamber.

15. An electric circuit switching device comprising:
(a) first and second electrodes supported in electrically insulated relationship and having respective electrode faces positioned in opposed spaced relationship;
(b) enclosure means providing a closed chamber having said spaced electrode faces included therein;
(c) supply means communicating with said chamber adapted to selectively supply a conductive fluid thereto;
(d) a discharge passageway communicating with said chamber and having an outlet from said chamber disposed approximately at the center of one of said electrode faces;
(e) means for connecting said electrodes in an electrical circuit; and
(f) said supply means including a passageway to said chamber disposed in said enclosure means.

16. An electric circuit switching device comprising:
(a) first and second electrodes supported in electrically insulated relationship and having respective electrode faces positioned in opposed spaced relationship;
(b) enclosure means providing a closed chamber having said spaced electrode faces included therein;
(c) supply means communicating with said chamber adapted to selectively supply a conductive fluid thereto;
(d) a discharge passageway communicating with said chamber and having an outlet from said chamber disposed approximately at the center of one of said electrode faces;
(e) means for connecting said electrodes in an electrical circuit; and
(f) said supply means including a passageway through said chamber disposed in the electrode having said one electrode face thereon.

17. The method of selectively establishing conduction of electric current that can have a sustained density in excess of 100 amperes per square inch between two fixed electrode faces of complementary shape, which method comprises:
(a) positioning said electrode faces in closely spaced opposed relationship;
(b) selectively supplying under pressure a conductive liquid to the space between said electrode faces; and
(c) continuously recirculating the liquid so supplied through said space under the influence of magnetic forces attendant electrical conduction between said electrode faces.

References Cited
UNITED STATES PATENTS

| | | | |
|---|---|---|---|
| 2,560,717 | 7/1951 | Boyer | 200—152 |
| 2,577,653 | 12/1951 | Dysart | 200—152 X |
| 2,677,033 | 4/1954 | Smith | 200—152 |
| 3,161,822 | 12/1964 | Streater | 200—112 X |

ROBERT K. SCHAEFER, *Primary Examiner.*

H. HOHAUSER, *Assistant Examiner.*